United States Patent [19]
Fontaine et al.

[11] Patent Number: 5,820,100
[45] Date of Patent: Oct. 13, 1998

[54] ELECTROMAGNETIC LINEAR ACTUATOR WITH MOVABLE PLATES AND VALVE FLUID REGULATOR CONTROLLED BY THE ACTUATOR

[75] Inventors: Laurent Fontaine, Auribeau; Claude Tallend, Boinvilliers; Jean Yves Frere, Paris, all of France

[73] Assignee: Aerospatiale Societe Nationale Industrielle, Paris Cedex, France

[21] Appl. No.: 849,244

[22] PCT Filed: Oct. 11, 1996

[86] PCT No.: PCT/FR96/01593

§ 371 Date: Aug. 22, 1997

§ 102(e) Date: Aug. 22, 1997

[87] PCT Pub. No.: WO97/14160

PCT Pub. Date: Apr. 17, 1997

[30] Foreign Application Priority Data

Oct. 12, 1995 [FR] France .................................. 95 11976

[51] Int. Cl.⁶ .................................................... F16K 31/02
[52] U.S. Cl. .................. 251/129.16; 251/129.1; 251/129.2; 335/278; 335/281
[58] Field of Search ............................ 251/129.16, 129.1, 251/129.2, 335.3, 129.17, 65, 129.15, 129.19; 335/255, 261, 229, 234, 230, 278, 281, 250, 268

[56] References Cited

U.S. PATENT DOCUMENTS

| | | | |
|---|---|---|---|
| 1,700,228 | 1/1929 | Kendall | 251/129.16 |
| 3,201,661 | 8/1965 | Koutnik | 335/281 |
| 3,891,952 | 6/1975 | Winter et al. | 335/281 |
| 4,994,776 | 2/1991 | Juncu | 335/234 |
| 5,143,118 | 9/1992 | Sule | 251/129.16 |
| 5,314,164 | 5/1994 | Smith | 251/129.2 |
| 5,433,244 | 7/1995 | Sule | 251/129.16 |

FOREIGN PATENT DOCUMENTS

55-86983 A  7/1980  Japan .................................. 251/129.2

*Primary Examiner*—Denise L. Ferensic
*Assistant Examiner*—John Ball
*Attorney, Agent, or Firm*—Oblon, Spivak, McClelland, Maier & Neustadt, P.C.

[57] ABSTRACT

An electromagnetic linear actuator having a stationary annular assembly with a magnetic outer shell and a magnetic inner core. Monostable or bistable control components may be mounted interchangeably between the outer shell and inner core. An assembly which is moveable in the axis of the annular assembly includes two magnetic plates which face the extremities of the annular assembly and a rod which is mounted so that it can slide inside the core. The first core is made of a material chosen for its frictional characteristics. The actuator may be used to control the valve of a regulator in the fuel supply circuit of a satellite engine.

19 Claims, 3 Drawing Sheets

ELECTROMAGNETIC LINEAR ACTUATOR WITH MOVABLE PLATES AND VALVE FLUID REGULATOR CONTROLLED BY THE ACTUATOR

BACKGROUND OF THE INVENTION

1. Field of the Invention

The invention relates principally to an electromagnetic linear actuator designed to control a low-amplitude displacement.

This type of actuator may be used in numerous fields wherever there is a need to control a low-amplitude linear displacement. It is of particular interest in fields such as aeronautics and aerospace where reducing the weight and dimensions of actuators is crucial.

The invention also relates to a fluid regulator in which at least one valve is controlled by an actuator according to the invention and designed particularly for use in ensuring the ergol supply of satellite engines.

2. Discussion of the Background

Existing electromagnetic actuators comprise a ring-shaped stationary assembly mainly constituted of means of electromagnetic control. Activating these electromagnetic control means creates a magnetic flux that controls the linear displacement of a magnetic core composed of a cylindrical rod housed in such a way as it can slide inside the stationary assembly.

Such existing linear actuators can be divided into two structurally-different groups depending on whether they are of the monostable or bistable type.

In monostable linear actuators the means of electromagnetic control consist solely of a trip coil. The power supply of this coil controls the displacement of the movable coil in a direction determined by the direction of the current passing through the coil. Displacement of the core in the opposite direction, determining the rest state of the actuator, may be effected by gravity, by a spring built into the actuator or by return means built into the apparatus controlled by the actuator.

In bistable linear actuators the means of electromagnetic control comprise at least one trip coil and at least one permanent magnet. The power supply of the coil or coils determines whether the movable core is displaced in one or the other direction depending on the direction of the current without the need for means of returning the core.

Both monostable and bistable movable core electromagnetic linear actuators are relatively large in size and are consequently relatively heavy when a high magnetic flux is required.

In addition, using a movable core requires the creation of parts whose surfaces in friction contact with one another are permeable to the magnetic flux. The choice of materials available is consequently very limited and generally ill-suited to this type of friction contact.

Furthermore, movable core linear activators are usually manufactured completely separately using different parts for monostable and bistable type systems, which tends to increase production costs.

SUMMARY OF THE INVENTION

The aim of the present invention is to produce an electromagnetic linear actuator whose original design reduces size and weight for a given force compared with movable core actuators using the known art.

The invention also relates to an electromagnetic linear actuator whose original design gives prolonged service life and reduces heating compared with movable core linear actuators by enabling the movable cylindrical rod to be made of any friction-resistant material.

A further aim of the invention is to produce an electromagnetic linear actuator that can be made monostable or bistable by simply replacing the electromagnetic control means, thereby significantly reducing manufacturing costs when compared with existing actuators.

These three objectives are achieved by the invention using an electromagnetic linear actuator comprising:

a stationary assembly in the form of a ring around an axis including, working from the outside inwards, a magnetic outer shell, electromagnetic control means and a magnetic inner core, two spacers being placed between the outer magnetic shell and the magnetic inner core on either side of the electromagnetic control means, and removable fastening means mechanically linking the magnetic inner core and the outer magnetic shell via the spacers, and a movable assembly capable of moving in the said axis when the electromagnetic control means are activated, said movable assembly including at least one first magnetic plate positioned facing a first extremity of the stationary assembly, the actuator being constructed of standard mechanical parts suitable for being used with different types of electromagnetic control means.

In a preferred embodiment of the invention the actuator includes a second magnetic plate positioned facing a second extremity of the stationary assembly and connected to the first magnetic plate by a rod that masses through the stationary assembly in such way as to enable it to slide in the said axis a distance determined by the bearing of the plates on the corresponding extremities of the stationary assembly.

The various electromagnetic control means include monostable and bistable control means.

The monostable control means comprise a trip coil and the two spacers including a magnetic spacer and a non-magnetic spacer positioned on either side of the trip coil.

Similarly, the bistable control means comprise a permanent magnet positioned between two coils, the two spacers being non-magnetic and positioned on either side of the coils.

In the preferred embodiment of the invention the outer magnetic shell and the magnetic inner core are linked by fasteners that simultaneously pass through the outer magnetic shell, the spacers and the magnetic inner core.

The invention also relates to a preferred application of said actuator to controlling at least one valve in a fluid regulator of the type used to ensure the ergol supply of satellite engines.

This application proposes a fluid regulator comprising at least one valve controlled by an actuator according to the invention characterized by the fact that the valve comprises:

a valve-seat formed in a passage through a stationary body, said seat being centered on a second axis parallel to the axis of the stationary assembly of the actuator, an actuating lever mounted so as to pivot in the stationary body around a third axis at right angles to said second axis, said lever being oriented more or less at right angles to the axis of the stationary assembly of the actuator and the second and third axes, a flap-type check valve fastened to a first extremity of the actuating lever so as to constitute a leaktight seal when it presses on valve-seat in one position of the actuator, a leaktight bellows disposed around the actuating lever, connected to said lever by a first extremity and connected to the stationary body by the other extremity.

In a first embodiment the valve seat is plane and the flap is fastened to the first extremity of the actuating lever by means for adjusting the orientation of the flap.

In a second embodiment the valve-seat is conical and the check-valve is spherical.

The above fluid regulator advantageously comprises at least a first valve controlled by a first actuator that includes bistable electromagnetic control means and at least a second valve controlled by a second actuator that includes monostable electromagnetic control means, the first and second valves being designed to be placed in the given order in a fluid supply circuit.

Where two fluids are to be regulated simultaneously, for example to supply a satellite engine with two different ergols, the regulator comprises two first valves controlled simultaneously by the first actuator and two second valves controlled simultaneously by the second actuator, the first and second valves being designed to be placed in the given order in two parallel fluid supply circuits.

BRIEF DESCRIPTION OF THE DRAWINGS

Two preferred embodiments of the invention, given as non-restrictive examples, will now be described with reference to the attached drawings where.

DETAILED DESCRIPTION OF EMBODIMENTS

Figure 1:
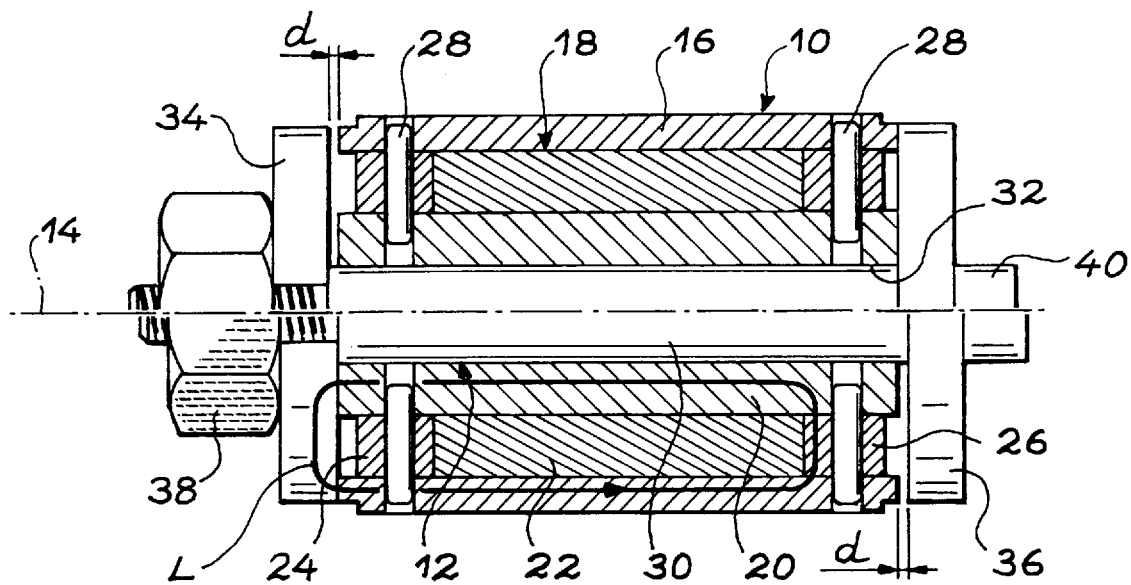
FIG. 1 is a partial longitudinal cross-section that shows a monostable electromagnetic linear actuator according to the invention; the upper half of the drawing shows the actuator in the rest state while the lower half shows it in its activated state.

FIG. 1 shows a monostable electromagnetic linear actuator according to the invention. This actuator comprises a stationary assembly identified by the overall reference 10, together with a movable assembly identified by the overall reference 12.

Stationary assembly 10 is in the form of a ring around an axis 14. Working from the outside inwards, the assembly consists of a magnetic outer shell 16, electromagnetic control means 18 and a magnetic inner core 20.

In the embodiment shown in FIG. 1, which concerns a monostable actuator, electromagnetic control means 18 consist essentially of a trip coil 22. On either side of this trip coil 22 spacers 24 and 26 are inserted between the outer magnetic shell 16 and the magnetic inner core 20.

One of the spacers 24 is preferably made of a non-magnetic material while the other spacer 26 is made of a magnetic material. In a variant of the embodiment, spacers 24 and 26 may both be made of a non-magnetic material.

Spacers 24 and 26 provide a mechanical link between magnetic inner core 20 and magnetic outer shell 16. More precisely, core 20 and shell 16 are assembled by means of spacers 24 and 26 and fastening means that consist, in the embodiment shown, of fastening stud pins 28 that are driven through holes bored through core 20, spacers 24 and 26 and outer magnetic shell 16. In a variant of the embodiment, fastening stud pins 28 may be replaced by any other easily-dismantled fastening devices such as screws.

Movable assembly 12 of the monostable electromagnetic linear actuator shown in FIG. 1 comprises a cylindrical rod 30 capable of sliding in axis 14 inside a bore 32 cut through magnetic inner core 20 of the stationary assembly 10.

Movable assembly 12 also includes two magnetic plates 34 and 36 fastened to cylindrical rod 30 on either side of stationary assembly 10 so that they are facing each extremity of this assembly. More precisely, the diameter of magnetic plates 34 and 36 is more or less the same as the external diameter of the ends of shell 16.

Magnetic plates 34 and 36 may be mounted on cylindrical rod 30 by any convenient means. For example, in the embodiment shown in FIG. 1, magnetic plate 34 is mounted on a threaded end-piece of rod 30 between a nut 38 screwed onto said threaded end-piece and a shoulder formed on the rod. Magnetic plate 36 is locked against the opposite end of cylindrical rod 30 by a fastening component (not shown) such as a screw axially inserted into rod 30.

In a variant of this embodiment, magnetic plate 36 may be made all in one piece with cylindrical rod 30. Since, however, it is possible for cylindrical rod 30 also to be made of a magnetic material, magnetic plates 34 and 36 are preferably mounted on rod 30 which is advantageously made of a different, non-magnetic material selected for its good friction characteristics.

When the monostable electromagnetic linear actuator shown in FIG. 1 is in the rest state, i.e. when trip coil 22 is not energized, movable assembly 12 is in the position shown in the upper half of the Figure. The actuator is maintained in this position by outside means (not shown) that may be gravity if axis 14 is disposed more or less vertically, or by external return means that are part of the apparatus (not shown) controlled by the actuator. In this rest state, magnetic plate 36 presses against the corresponding extremity of stationary assembly 10 while magnetic plate 34 is distanced from the other end of stationary assembly 10 by a distance d that is the travel of the actuator.

When trip coil 22 is energized, the actuator moves into the active position shown in the lower half of FIG. 1. Energizing trip coil 22 creates a magnetic flux whose force field passes successively through magnetic outer shell 16, magnetic spacer 26, magnetic inner core 20 and magnetic plate 34 as indicated by letter L in the lower half of FIG. 1. Movable assembly 12 is therefore subjected to a force oriented along axis 14 which tends to displace the assembly towards the right of FIG. 1. Magnetic plate 34 therefore presses against the corresponding end of stationary assembly 10 while magnetic plate 36 moves away from the other end of assembly 10 by distance d.

Displacement of movable assembly 12, i.e. movement of the actuator from its rest to its active state, normally results in action on one or more of the devices (not shown) it controls via at least one stud 40 fastened to the surface of magnetic plate 36 facing outwards from the actuator. The length of stud 40 is preferably adjustable. For example, where the device controlled by the actuator is a valve, stud 40 acts, directly or indirectly, on the flap of the valve.

The stationary nature of magnetic inner core 20 combined with the use of a movable assembly 12 comprising a magnetic plate 34, initially distanced from stationary assembly 10, means that rod 30 in friction contact with core 20 can be made of any suitable material. This material can therefore be selected for its friction characteristics, thereby increasing the service life of the actuator and reducing heating.

The looping of force field L around magnetic plate 34 also generates greater force for a given size of actuator than is generated in conventional movable-core actuators. These improved performance characteristics enable the size and weight of actuators to be reduced, which is particularly important in the aeronautics and aerospace industries.

Figure 2:
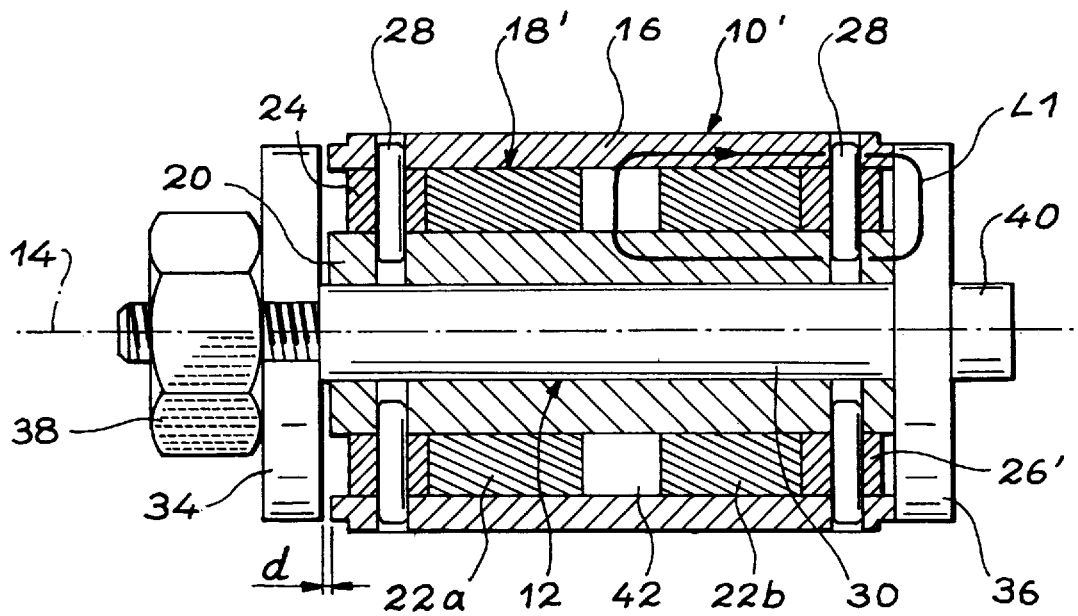
FIG. 2 is a similar view to that of FIG. 1 and shows a bistable electromagnetic linear actuator according to the invention in the first of its two stable states.
Figure 3:
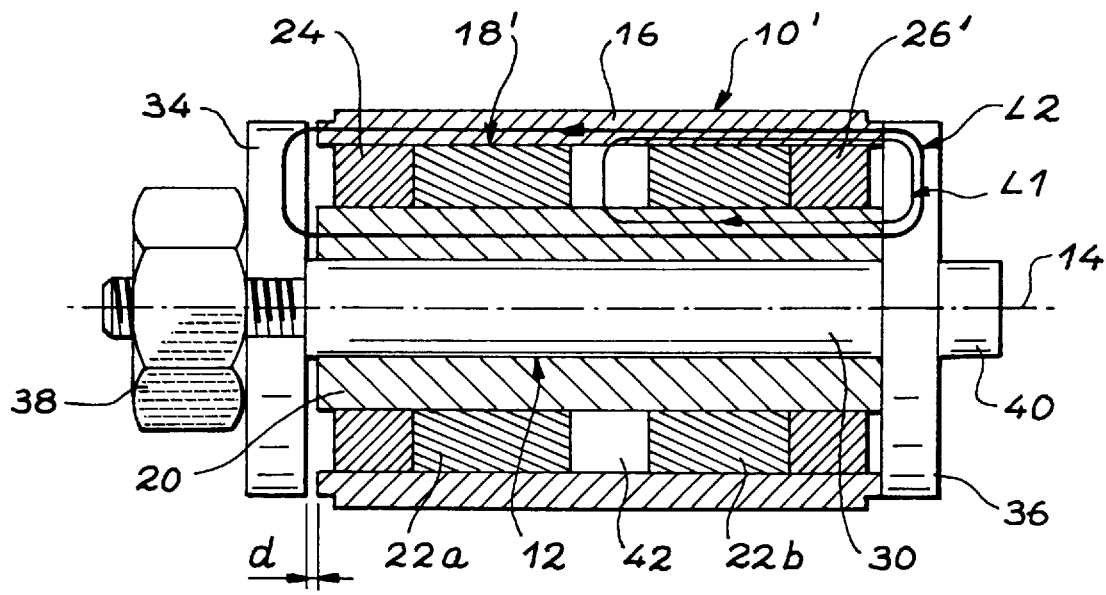
FIG. 3 shows the actuator of FIG. 2 when a change of state is commanded.
Figure 4:
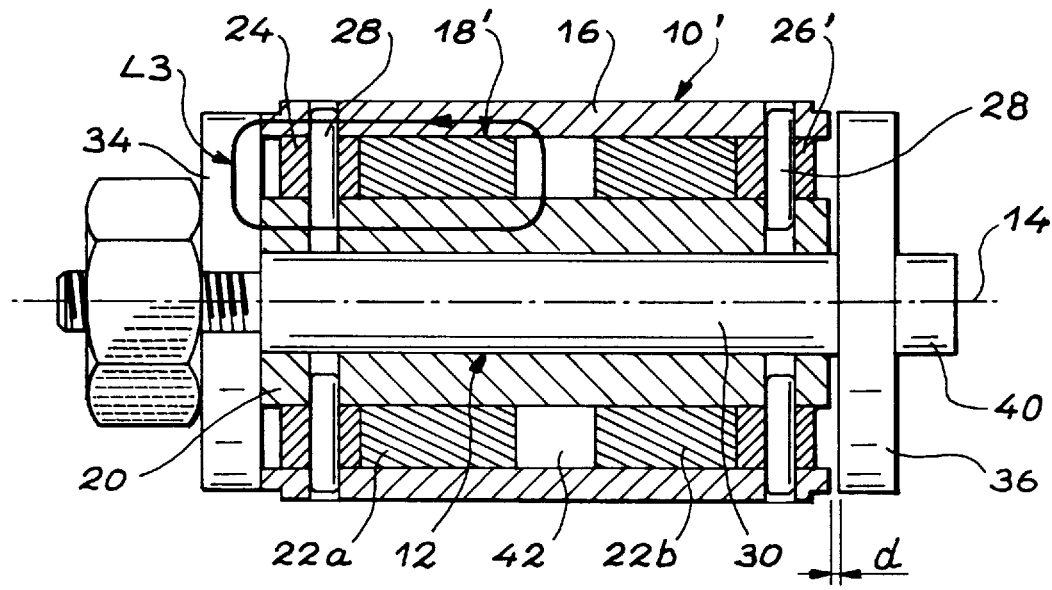
FIG. 4 shows the actuator of FIG. 2 in its second stable state.

As shown by FIGS. 2 through 4, the monostable electromagnetic linear actuator of FIG. 1 can easily be converted into a bistable electromagnetic linear actuator while retaining most of the mechanical components used to construct it.

For example, the only difference between stationary assembly 10' of the bistable actuator shown in FIGS. 2 through 4 and stationary assembly 10 of the monostable actuator in FIG. 1 is the electromagnetic control means 18' introduced between the magnetic outer shell 16 and magnetic inner core 20. The movable assembly 12 also remains unchanged, i.e. it principally comprises a cylindrical rod 30 bearing magnetic plates 34 and 36 facing each extremity of stationary assembly 10'.

In the embodiment shown in FIGS. 2 through 4 the electromagnetic control means 18' comprise two trip coils 22a and 22b housed between shell 16 and core 20 and offset from one another in axis 14. The electricity supplies running through trip coils 22a and 22b flow in opposite directions. Control means 18' also comprise a radially magnetized permanent magnet 42 positioned between coils 22a and 22b. Moreover, spacers 24 and 26' positioned between shell 16 and core 20 on either side of coils 22a and 22b are both non-magnetic.

Similarly to the monostable actuator shown in FIG. 1, the magnetic outer shell 16 and the magnetic inner core 20 are assembled using stud pins 28 that pass through holes bored in shell 16, spacers 24, 26' and core 20.

In FIG. 2 the bistable electromagnetic linear actuator is shown in a first stable state similar to the rest state of the monostable actuator described previously with reference to FIG. 1. However, instead of being obtained due to external forces, this stable state is obtained naturally by the flux created by magnet 42.

As shown at L1 in the upper half of FIG. 2, the magnet therefore generates a magnetic flux that flows successively through the magnetic outer shell 16, magnetic plate 36 and magnetic inner core 20. Plate 36 is thus pressed against one extremity of stationary assembly 10' such that the other plate 34 is moved away from the other end of stationary assembly 10' by distance d.

The actuator goes into its second stable state, shown in FIG. 4, when trip coils 22a and 22b are energized such that the magnetic flux is orientated in the opposite direction to that created by permanent magnet 42. The flux thereby generated flows successively through shell 16, magnetic plate 34, core 20 and magnetic plate 36, as shown by L2 in FIG. 3. The resulting flux present in the airgap between stationary assembly 10' and magnetic plate 36 is canceled and the flux present in the airgap between stationary assembly 10' and magnetic plate 34" generates a force of attraction along axis 14. Plate 34 is therefore pressed against one extremity of stationary assembly 10' such that the other plate 36 is moved away from the other end of the stationary assembly by distance d.

The position thereby obtained is preserved when the power supply to the coil is cut since the flux of magnet 42 passes through magnetic plate 34 as shown by L3 in the upper half of FIG. 4. The second stable position is therefore achieved.

The actuator is returned to the first state illustrated by FIG. 2 by energizing second coil 22a or 22b so that the magnetic flux is oriented in the opposite direction to that created by permanent magnet 42.

Whether monostable or bistable, the electromagnetic linear actuator according to the invention acts on the device or devices (not shown) it controls via the stud or studs 40 shown on the right of FIGS. 1 to 4.

The embodiments of the electromagnetic linear actuator according to the invention may be modified in various ways while remaining within the terms of the invention.

For example, in the monostable actuator described with reference to FIG. 1, magnetic plate 36 may be eliminated and replaced with any type of stop to limit the distance between magnetic plate 34 and the extremity of stationary assembly 10 to a predetermined distance d. In this variant it will be seen that the special structure of the actuator limits this distance d to a relatively small value.

In the bistable actuator described with reference to FIGS. 2 through 4, one of the two trip coils may be eliminated. The change from one stable state to the other is then achieved using a single coil that is energized with different polarities depending on the stable state required.

Figure 5:
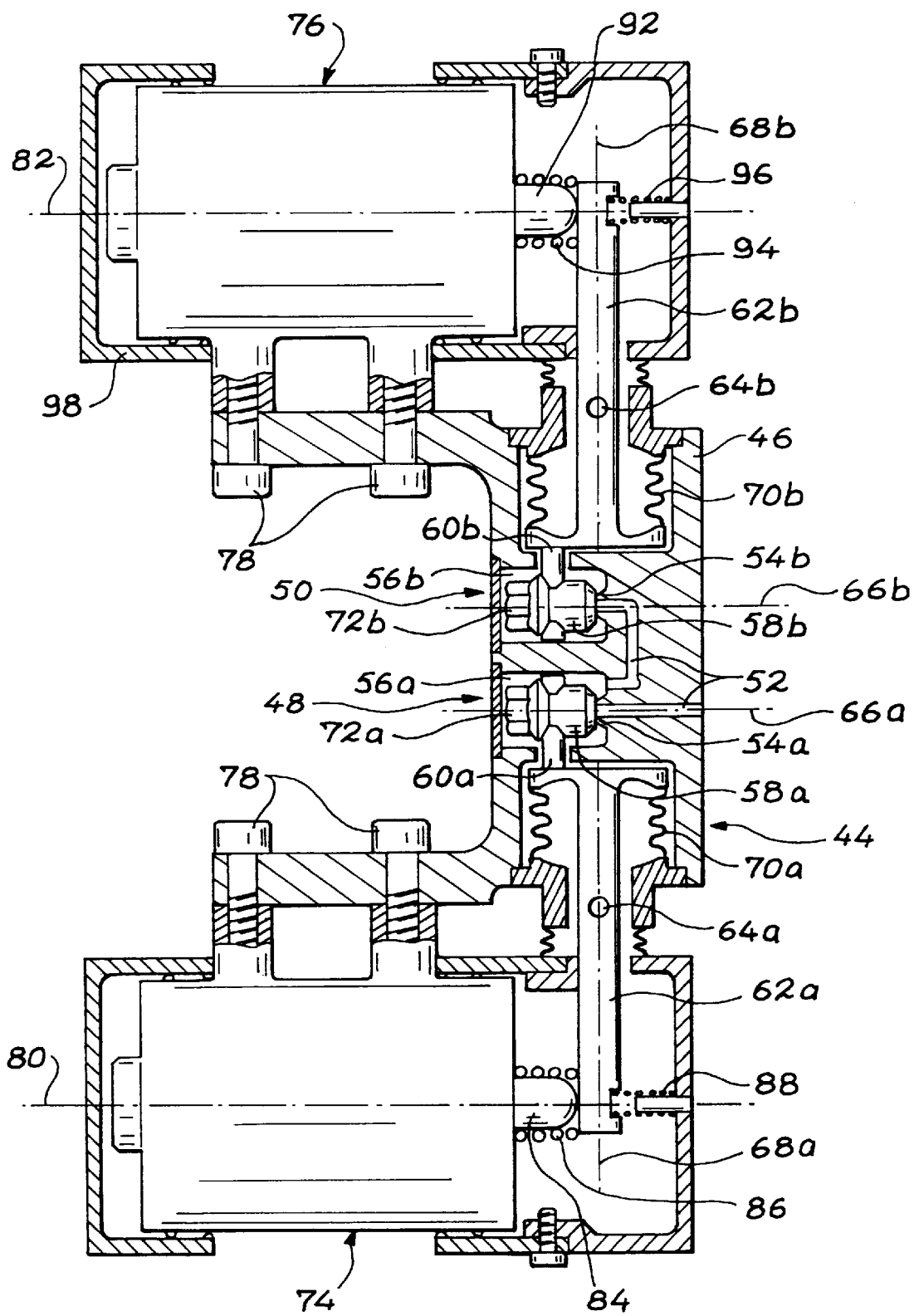
FIG. 5 is a partial cross section showing one application of actuators of FIGS. 1 through 4 to controlling the valves of a fluid regulator.

FIG. 5 shows an application of the monostable and bistable actuators that have been described with reference to FIGS. 1 through 4 to the control of fluid regulator valves. This application has been particularly designed for inclusion in two parallel circuits ensuring the ergol supply of satellite engines (not shown) from two tanks (not shown) containing ergols under pressure.

The regulator, generally designated 44, comprises two identical valve assemblies disposed in parallel inside a single body 46, only one of which is visible in FIG. 5. Each of these valve assemblies is designed to be mounted in one of the previously-mentioned parallel ergol supply circuits.

Each of these valve assemblies comprises a first valve 50 and a second valve 48, mounted in series in this order inside passage 52 that passes through body 46. The two extremities of each passage 52 are fitted with connectors (not shown) used to mount the regulator in the two fluid circuits mentioned above.

Since valves 48 and 50 are identical, only one secondary valve 48 will be described with reference to the numbers followed by the letter a. The description applies equally to primary valves 50 where letter a should be replaced by b.

Each secondary valve 48 comprises a valve-seat 54a formed in passage 52, from the center of which opens a section upstream of said passage. Beyond the valve-seat 54a, passage 52 widens out to form a chamber 56a housing the flap 58a of valve 48.

Flap 58a of each valve 48 is fasted to a shaft at the end of an actuating lever 62a that pivots in body 46 of the regulator on axle 64a. More precisely, if the axle of valve-seat 54a is referred to as 66a, axles 64a and 66a are mutually perpendicular and both approximately perpendicular to longitudinal axis 68a of lever 62a.

In the configuration shown in FIG. 5, where axes 66a and 66b of valve-seats 48 and 50 are parallel to one another, as are axes 64a and 64b of levers 62a and 62b, longitudinal axes 68a and 68b of levers 62a and 62b of the same valve assembly of the regulator are identical when the two valves are closed.

Shaft 60a bearing flap 58a is a disk-shaped protrusion of actuating lever 62a and is parallel to longitudinal axis 66a of said lever. Said shaft passes through the walls of chamber 56a; there is a certain degree of play between the shaft and the walls. A first extremity of a metal sealing bellows 70a hermetically fastened to said disk-shaped section of lever 62a and surrounds an adjacent section of said lever. The other end of bellows 70a is fastened to a removable section of body 46 bearing axle 64a.

The configuration described above ensures that chamber 56a is leaktight in relation to the exterior of regulator 44 without the force required to ensure the leaktightness of valve 48 being disrupted by the pressure of the force exerted by bellows 70a. Response time is therefore improved and electrical consumption and weight are both reduced.

The use of flap 58a fastened to the end of lever 62a that actuates it increases service life by avoiding any friction wear at this site. Leaktightness is also increased since no particles created by friction can come between flap 58a and seat 54a.

The stiffness of the connection between flap 58a and actuating lever 62a might prevent leaktight sealing of valve 48 if strict positioning tolerances are not complied with.

In order to overcome this drawback, flap 58a is fastened to shaft 60a by means of adjusting its orientation 72a when the plane surface of flap 58a and seat 54a press against one another as shown in FIG. 5. Said orientation adjustment means 72a comprise, for example, a spherical surface formed on shaft 60a trapped between two conical surfaces connected to the flap together with a locking screw or nut.

In a variant of this embodiment such orientation adjustment means may be eliminated, flap 58a replaced by a ball and valve-seat 54a made frustoconical in shape.

Actuating levers 62a and 62b extend beyond their axles 64a and 64b to protrude from body 46 of regulator 44 where they can be actuated by actuators 74 and 76 respectively.

More precisely, a single actuator 76 acts on the two levers 62b to control the two primary valves 50 simultaneously and a single actuator 74 acts on the two levers 62a to control the two secondary valves 48 simultaneously.

Actuator 76 is a bistable actuator of the type described above with reference to FIGS. 2 through 4. It controls the opening of primary valves 50 during the entire time an engine receives a fuel supply. It also constitutes a safety device that closes the fuel supply circuits in the event of secondary valves 48 getting stuck in the open position.

Actuator 74 is a monostable actuator identical to that described above with reference to FIG. 1. It can be used to control the precise movement of secondary valves 48 when the engine requires a supply of ergols.

The magnetic outer shells of actuators 74 and 76 are fastened by screws 78 to a bracket of body 46 of regulator 44. The actuators are fastened so that the respective axes 80 and 82 of stationary assemblies of actuators 74 and 76 are parallel to one another and to axes 66a and 66b of valve-seats 48 and 50 and oriented at right angles to longitudinal axes 68a and 68b of actuating levers 62a and 62b.

More precisely, actuator 74 acts simultaneously on the ends of the two levers 62a via two studs 84 whose length is preferably adjustable. A low-rating helical compression spring 86 is mounted on each stud 84 to maintain the normal slight play between studs 84 and levers 62a in order to prevent any transmission of vibrations.

Consequently the valves 48 are retained in the closed position both by return springs 88 disposed between the ends of levers 62a and a unit 90 connected to the magnetic outer shell of actuator 74. Return springs 88 are disposed along the axes of studs 84 on the other side of the levers 62a from the studs. Springs 88 have a higher rating than springs 86.

Similarly, actuator 76 acts simultaneously on the ends of the two levers 62b via two studs 92, preferably of adjustable length, that are maintained very slightly distanced from the levers by helical compression springs 94. Return springs 96 bearing on unit 98 connected to the magnetic outer shell of actuator 76 maintain valves 50 in the closed position.

FIG. 5 shows the apparatus in the rest state. Valves 48 and 50 are maintained closed by springs 88 and 96 alone.

When a satellite engine is to be supplied with ergols via the apparatus in FIG. 5, bistable actuator 76 is brought into its second stable state, resulting in displacement of studs 92 to the right of FIG. 5. Levers 62b thus control the simultaneous opening of the two primary valves 50. Valves 50 remain in this state until the supply of ergols is interrupted.

As soon as opening of primary valves 50 is commanded, secondary valves 48 are actuated so that they move in a controlled manner to supply the engine with the required quantities of ergols. This is effected by controlling monostable actuator 74 using electrical pulses whose duration and spacing are controlled.

The application that has been described with reference to FIG. 5 is only given as an example and should not be considered restrictive.

We claim:

1. Electromagnetic linear actuator comprising:

a stationary assembly in the shape of a ring around an axis, including, working from the outside inwards, a magnetic outer shell, electromagnetic control means and a magnetic inner core, two spacers being placed between the outer magnetic shell and the magnetic inner core on either side of the electromagnetic control means, and removable fastening means mechanically linking the magnetic inner core and the outer magnetic shell passing through the spacers, and a movable assembly capable of moving in the said axis when the electromagnetic control means are activated, said movable assembly including at least one first magnetic plate positioned facing a first extremity of the stationary assembly, the actuator being constructed of standard mechanical parts suitable for being used with different types of electromagnetic control means.

2. Actuator of claim 1 in which movable assembly comprises a second magnetic plate positioned facing a second extremity of the stationary assembly and connected to the first magnetic plate by a rod that passes through the stationary assembly in such way as to enable it to slide in the said axis a distance determined by the bearing of the plates on the corresponding extremity of the stationary assembly.

3. Actuator as claimed in claim 1 in which the various types of electromagnetic control means comprises monostable control and bistable control means.

4. Actuator of claim 3 in which the monostable control means comprise a trip coil, the two spacers including a magnetic spacer and a nonmagnetic spacer disposed on either side of the trip coil.

5. Actuator of claim 3 in which the bistable control means comprise a permanent magnet placed between two trip coils, the two spacers being non-magnetic and positioned on either side of the trip coils.

6. Fluid regulator comprising at least one valve controlled by an actuator according to claim 1 in which the valve comprises:

a valve-seat formed in a passage through a stationary body, said seat being centered on a second axis parallel to the axis of the stationary assembly of the actuator, an actuating lever mounted so as to pivot in the stationary body around a third axis at right angles to said second axis, said lever being oriented more or less at right angles to the axis of the stationary assembly of the actuator and the second and third axes, a flap fastened to a first extremity of the actuating lever so as to constitute a leaktight seal when it presses on valve-seat in one position of the actuator, a leaktight bellows disposed around the actuating lever, connected to said lever by a first extremity and connected to the stationary body by the other extremity.

7. Regulator of claim 6 in which the valve-seat is plane and the flap is fastened to the first end of actuating lever by orientation adjustment means.

8. Regulator of claim 6 in which the valve-seat is conical and the check-valve spherical.

9. Regulator of claim 6 comprising at least one primary valve controlled by a first actuator including bistable electromagnetic control means and at least one secondary valve controlled by a second actuator including monostable electromagnetic control means, the first and second valves being designed to be placed in the given order in a fluid supply circuit.

10. Regulator of claim 9 comprising two first valves controlled simultaneously by the first actuator and two second valves controlled simultaneously by the second actuator, the first and second valves being designed to be placed in the given order in two parallel fluid supply circuits.

11. Actuator as claimed in claim 2 in which the various types of electromagnetic control means comprise monostable control means and bistable control means.

12. Actuator of claim 11 in which the monostable control means comprise a trip coil, the two spacers including a magnetic spacer and a nonmagnetic spacer disposed on either side of the trip coil.

13. Actuator of claim 11 in which the bistable control means comprise a permanent magnet placed between two trip coils, the two spacers being non-magnetic and positioned on either side of the trip coils.

14. Actuator of claim 12 in which the bistable control means comprise a permanent magnet placed between two trip coils, the two spacers being non-magnetic and positioned on either side of the trip coils.

15. Actuator of claim 4 in which the bistable control means comprise a permanent magnet placed between two trip coils, the two spacers being non-magnetic and positioned on either side of the trip coils.

16. Regulator of claim 7 comprising at least one primary valve controlled by a first actuator including bistable electromagnetic control means and at least one secondary valve controlled by a second actuator including monostable electromagnetic control means, the first and second valves being designed to be placed in the given order in a fluid supply circuit.

17. Regulator of claim 8 comprising at least one primary valve controlled by a first actuator including bistable electromagnetic control means and at least one secondary valve controlled by a second actuator including monostable electromagnetic control means, the first and second valves being designed to be placed in the given order in a fluid supply circuit.

18. Regulator of claim 16 comprising two first valves controlled simultaneously by the first actuator and two second valves controlled simultaneously by the second actuator, the first and second valves being designed to be placed in the given order in two parallel fluid supply circuits.

19. Regulator of claim 17 comprising two first valves controlled simultaneously by the first actuator and two second valves controlled simultaneously by the second actuator, the first and second valves being designed to be placed in the given order in two parallel fluid supply circuits.

* * * * *